United States Patent [19]

Schneider et al.

[11] Patent Number: 5,509,704
[45] Date of Patent: Apr. 23, 1996

[54] CANTILIVERED RETENTION LATCH

[75] Inventors: Christian Schneider, Flowery Branch; John H. Hackenberg, Atlanta; Aaron P. Clark, Buford, all of Ga.

[73] Assignee: Motorola, Inc., Schaumburg, Ill.

[21] Appl. No.: 283,328

[22] Filed: Aug. 1, 1994

[51] Int. Cl.⁶ .................................................. E05C 1/08
[52] U.S. Cl. .................. 292/163; 292/128; 292/DIG. 38
[58] Field of Search ............................. 292/121.91, 163, 292/128.8, 175, DIG. 63, DIG. 38

[56] References Cited

U.S. PATENT DOCUMENTS

| | | | |
|---|---|---|---|
| 3,728,664 | 4/1973 | Hurst | 339/91 R |
| 3,969,796 | 7/1976 | Hodsdon et al. | 24/270 |
| 4,390,198 | 6/1983 | Selinko | 292/DIG. 38 X |
| 4,904,549 | 2/1990 | Goodwin et al. | 429/97 |
| 5,060,990 | 10/1991 | Smith et al. | 292/91 |
| 5,092,788 | 3/1992 | Pristupa, Jr. et al. | 439/225 |
| 5,193,707 | 3/1993 | Mizumura | 292/175 X |
| 5,205,595 | 4/1993 | Svehaug | 292/DIG. 38 X |

FOREIGN PATENT DOCUMENTS

0445808A1  7/1991  European Pat. Off. .......... H04B 1/38

Primary Examiner—Rodney M. Lindsey
Attorney, Agent, or Firm—Kenneth M. Massaroni; Scott M. Garrett

[57] ABSTRACT

A latch (10) for latching or locking a battery housing (80) to an electronic device (70) which automatically locks in place upon the removal of pressure to a biased cantilevered beam (52) (54). Latch (10) is removal from a first position, in which the battery housing (80) is latched to the electronic device to a second position in which the battery housing (80) is unlocked from the electronic device.

3 Claims, 2 Drawing Sheets

CANTILEVERED RETENTION LATCH

TECHNICAL FIELD

This invention relates in general to portable radio batteries, and more specifically to latches for said radio batteries.

BACKGROUND OF THE INVENTION

Portable radios and telephones must be designed so that batteries and other power sources can be easily connected to said devices. Of course, once engaged it should be difficult to inadvertently disengage the batteries. That is, it should require a deliberate physical action to disengage the battery from the electronic device. This is due to the fact that users of electronic devices such as telephones and radios do not wish to have the battery disengaged unintentionally, as such disengagement will cause a loss of power in the device, and hence, loss of communication ability.

However, due to demands of the vast consumer market, ease of removal and insertion of a battery pack is a desirable feature. Accordingly, many different types of battery engagement latches have been previously proposed. Examples of these include, those taught in U.S. Pat. No. 5,092,788 to Pristupa, Jr., et al.; U.S. Pat. No. 3,728,664 to Hurst; U.S. Pat. No. 3,969,796 to Hodsdon, et al.; European Patent Publication No. 0445808A1 to Takagi; and U.S. Pat. No. 4,904,549 to Goodwin, et al.

Heretofore, the non-integrally formed latch assemblies consisted of two springs and a latch body. Assembling the latch into a finished battery pack product was extremely difficult as the springs used were quite small and difficult to untangle and insert. Moreover, the springs tended to fall out of the pocket in the latch assembly prior to final assembly. Accordingly, a need exists for a latch that facilitates easy connection of a battery pack onto an electronic device, such as a radio housing or cellular telephone, and further provides for easy removal therefrom. The latch should also provide protection against accidental or unintentional removal the battery, while being easy to assemble and highly reliable.

DETAILED DESCRIPTION OF THE PREFERRED EMBODIMENT

Figure 1:
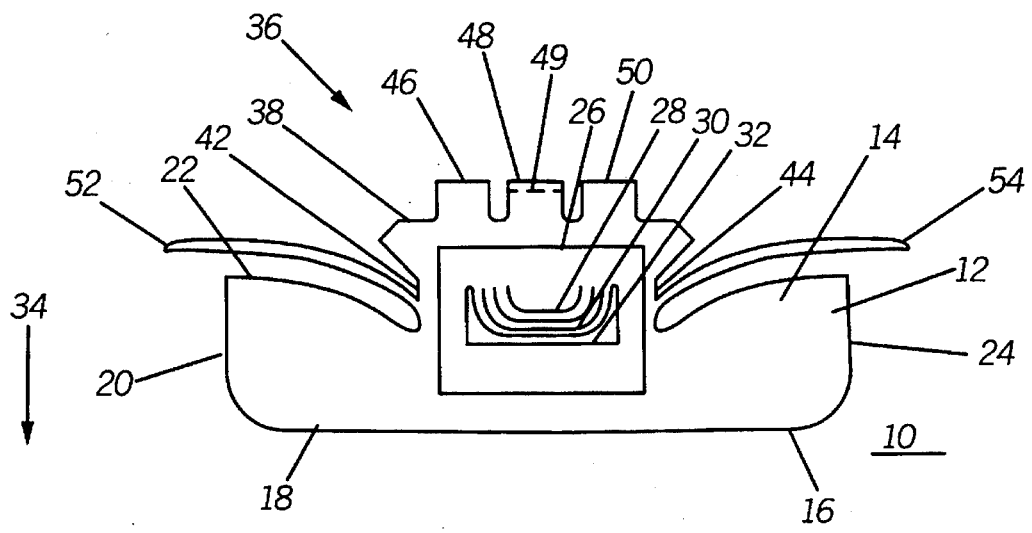
FIG. 1 is a top plan view of a battery latch in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a top view of a battery latch in accordance with the instant invention. The battery latch (10) includes a latch body (12) having first (14) and second (16) major surfaces thereon. The latch body further includes at least four side portions, (18, 20, 22, and 24). The latch body (12) may be fabricated of any of a number of known materials, examples of which include plastic, polymeric materials, metals, and combinations thereof. Alternatively, the latch body may be fabricated as an overmolded plastic part including both a metal and an overmolded plastic member.

Disposed on the first major surface (14) of said latch body (12) is a raised portion (26). The raised portion (26) is adapted to protrude through an opening in the housing into which the latch is incorporated. Further, said raised portion (26) is adapted to retain the latch in the housing of a battery (shown in greater detail hereinbelow), thereby preventing it from becoming disengaged from the battery housing. The raised portion (26) further includes at least one finger indented recess (28). Alternatively, or in addition to, there may be one or more raised ridge members a plurarity grooves (28, 30, and 32) formed therein. The finger recess and/or ridges (28) (30) and (32) may be provided to afford regions where a user's finger may engage the latch, so as to slideably move it thereby disengaging it from an electronic device, such as a cellular telephone, or a radio. In this embodiment, the finger recess (28) allows a user to slide the latch (10) in the direction of arrow (34) so as to disengage, for example, a battery pack, from said electronic device, in a manner described in greater detail hereinbelow.

Extending from side portion (22) is an engagement member (36) adapted to engage, for example, a recessed portion on an electronic device. The engagement member (36) includes first and second shoulders (38) and (40) extending from side portions (42) and (44) of engagement member (46) formed on each side of said engagement member. The shoulders may also be useful to prevent the latch from over-extending into a recess in, for example, an electronic device.

Figure 4:
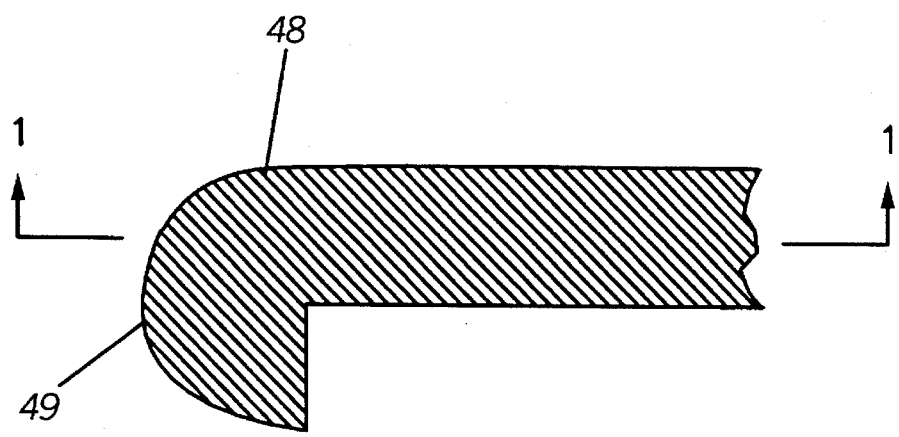
FIG. 4 is a side cross sectional detail view of a hooked engagement post of a battery latch in accordance with the invention.

Extending distally away from side portion (22) is at least one engagement post for extending into a recessed region on a battery or electronic device. As illustrated in FIG. 1, the battery latch (10) includes three engagement posts (46) (48) and (50). One of said engagement posts, for example, (48) may further be a hooked (49) (shown in phantom) engagement posts for providing positive connection between the battery pack, and the radio housing. Of course, said hook should be sufficient to assure positive connection, but not be so hooked as to render easy disconnection of the battery pack from the electronic device impossible. Alternatively, said engagement posts may be an elongated single engagement post. An appreciation of the hooked portion may be gained by a perusal of FIG. 4, a side cross sectional detail view of a hooked engagement post of a battery latch in accordance with the invention.

The engagement member further includes at least one biased cantilevered beam extending from each side portion thereof. Specifically the engagement member (36) includes first cantilevered beam (52) extending from side portion (42) and second cantilevered beam (54) extending from side portion (44). As will become more apparent from perusal of FIG. 2 and FIG. 3 below, when the biased cantilevered beam is in the relaxed condition, as illustrated in FIG. 1, the engagement members and particularly the engagement posts will be thrust distally away from the battery housing into which the latch member is enclosed and engage the recessed in, for example, a cellular phone or two-way radio. In order to disengage the battery pack from the electronic device, a user's finger engages ridges (28) (30) (32) sliding the latch (10) in the direction of arrow (34) so as to remove the engagement posts from the recessed region. While depressed, the battery pack and the electronic device may be slideably disengaged from one another.

Figure 2:
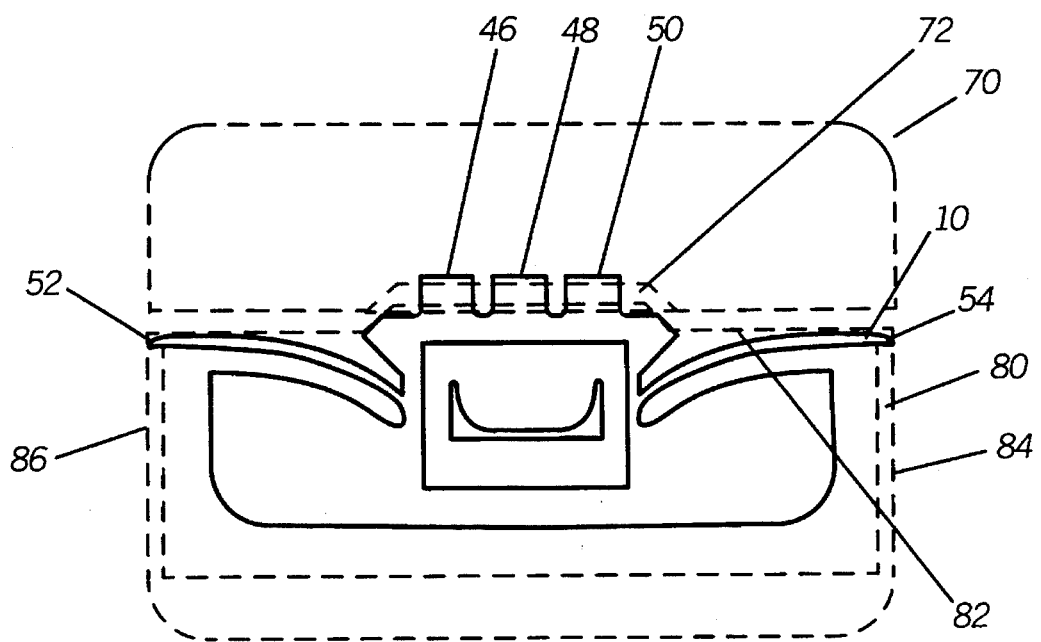
FIG. 2 is a top end view of a housing including a battery latch in the free, recoiled state, in accordance with the instant invention.

Referring now to FIG. 2, there is illustrated therein an electronic device, (70) and a battery pack housing (80) including the latch (10) in accordance with the instant invention. The latch (10) is in the free or recoiled condition, and accordingly, engagement posts (46) (48) and (50) extend into a recessed region (72) of electronic device (70). The battery housing (80) further includes a retaining slot (82) which engages raised member (26) so as to prevent the latch (10) from becoming disengaged from the housing (80). While FIG. 2 is illustrated with the latch (10) in a battery housing (80) it is to be understood that the latch may be mounted in the electronic device (70) instead. The latch (10) is in the free or recoiled condition, because the biased cantilevered beams (52) and (54) are resting upon side portions (84) and (86) of housing (80), in the unbiased condition.

Figure 3:
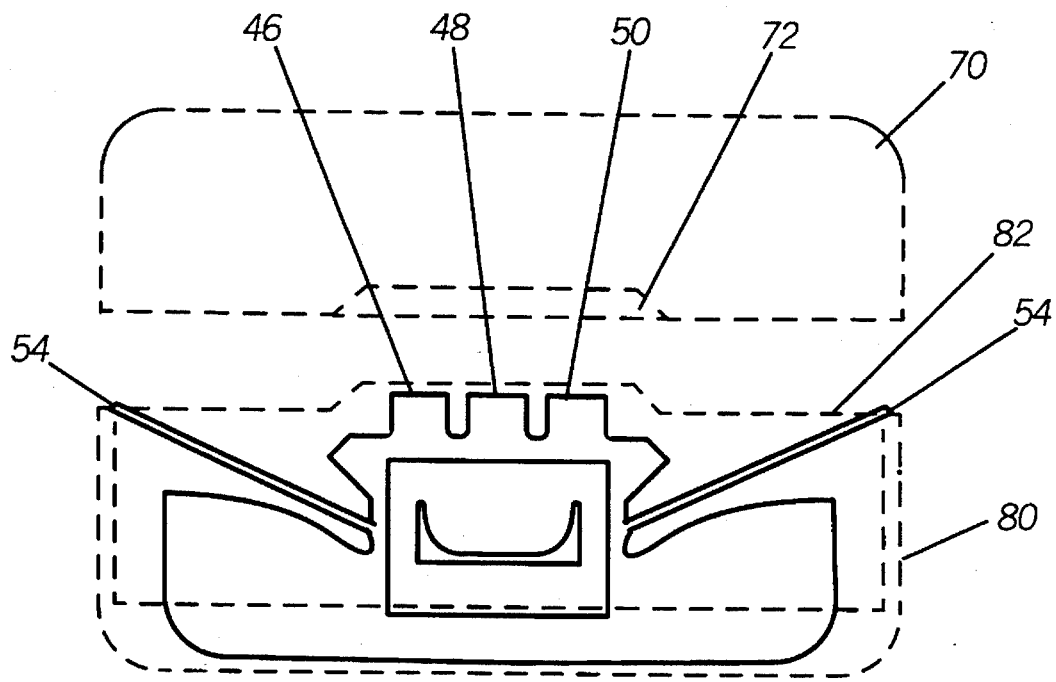
FIG. 3 is a top end view of a housing including battery latch in the activated state in accordance in the instant invention.

Conversely, and as in illustrated in FIG. 3, when the ridges formed in raised portion (26) are engaged by a user's finger and depressed in the direction of arrow (34) the engagement posts (46) (48) and (50) are withdrawn from the recessed region (72). Accordingly, the battery pack (80) and the electronic device (70) may be slideably disengaged from one another. It should be appreciated from FIG. 3 that as soon as pressure is released by the user, i.e., removing his finger from the grooves, the cantilevered beams (52) and (54) will return to the free or recoiled state illustrated in FIG. 2. The latch member (10) is prevented from leaving the battery housing (80) as raised member (26) engages slot (82).

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A latch for slideably connecting a battery pack to an electronic device, said latch comprising:

a latch body having first and second major surfaces, and four side portions, and being disposed in said battery pack and including both a metal and an overmolded plastic member;

a raised portion formed on said first major surface, said raised portion having at least one ridge formed therein and extending through an opening in said battery pack;

an engagement member extending from one of said side portion of said latch body, said engagement member including at least two side portions and at least one hooked end disposed distally away from said latch body, said hooked end portion adapted to engage a recessed region disposed on said electronic device; and at least one biased, cantilevered beam extending from each said side portion of said engagement member.

2. A latch as in claim 1, wherein said raised portion has a plurality of ridges found therein.

3. A latch as in claim 1, wherein said engagement member further includes at least two engagement posts disposed adjacent said at least one hooked end.

\* \* \* \* \*